2,970,030
PROCESS FOR THE PRODUCTION OF NEUTRALLY DEVELOPABLE TEXTILE PRINTS

Albert Bolleter, Muttenz, and Eduard Moser, Basel, Switzerland, assignors to Ciba Limited, Basel, Switzerland, a firm of Switzerland No Drawing. Filed Aug. 24, 1956, Ser. No. 605,935

Claims priority, application Switzerland Aug. 25, 1955

15 Claims. (Cl. 8—71)

This invention relates to a process for the production of neutrally developable textile prints.

For the production of water-insoluble azodyestuffs on the fiber by printing on of customary coupling components and stabilized diazo compounds with the addition of salts of halogen-fatty acids and alkalies to the printing pastes and development of the dyestuff by steaming with neutral steam, it is already known to use labile diazoamino-compounds with solubilizing groups in the stabilizer, as are obtained by combination of negatively substituted amines with stabilizers of weak basic character or of positively substituted amines with stabilizers of more strongly basic character, together with alkali salts of halogen-fatty acids and alkali in a quantity of at most 1–2 mols. calculated on the quantity of the coupling component.

The present invention is based on the observation that in some cases the use of alkali salts of halogenated fatty acids is not at all necessary and that textile prints developable with neutral steam and of equal value can be obtained in the absence of halogen-fatty acid salts. In the process of the invention there are used a customary coupling component for the manufacture of ice-colors, alkali in a quantity of preferably more than 2 mols, calculated on the quantity of the coupling component used, and a labile diazoamino compound of the general formula (1)
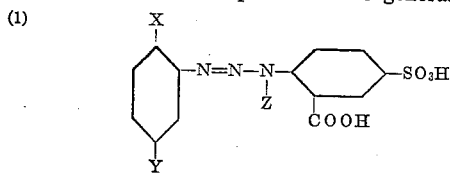

in which Y indicates a sulfonamide group which is preferably disubstituted, more especially by alkyl groups, Z is a low molecular, branched alkyl radical and X is a group of the composition $$-O_{m_{n-1}}C_nH_{2n+1}$$

in which $m$ and $n$ are each a positive whole number of which the product is at most 2.

As examples of suitable coupling components there may be mentioned:

Acetoacetylamino-compounds, such as 1-acetoacetylamino-4-acylamino-2:5-dialkoxybenzenes, e.g. 1-acetoacetylamino-4-acetyl- or -benzoylamino-2:5-dimethoxybenzene, 1 - acetoacetylamino - 4 - benzoylamino - 2:5- diethoxybenzene, or 1-acetoacetylamino-4-acetylamino-2-chloro-5-methoxybenzene; also hydroxycarbazole carboxylic acid arylides, such as 3-hydroxycarbazole-2-carboxylic acid-4'-chloranilide; and finally 6-methoxy- or 6-bromo-2-hydroxynaphthalene-3-carboxylic acid arylides and preferably hydroxynaphthalene carboxylic acid arylides of the formula

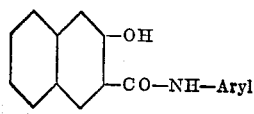

in which the aryl radical is, for example, a naphthalene radical or a radical of the benzene series, such as a phenyl-, 2-, 3- or 4-methylphenyl-, 2- or 4-methoxyphenyl-, 2- or 4-ethoxyphenyl-, 4-chloro-2-methylphenyl-, 2:5-dimethoxy-4-chlorophenyl-, 2:4-dimethoxy-5-chlorophenyl-, 2:6-dimethylphenyl- or 2-methyl-4-methoxyphenyl radical.

The diazoamino-compounds to be used together with the specified coupling components for the manufacture of the printing preparations to be used in the present process, can be obtained by methods known per se, for example by condensation of a diazotized aromatic base free from water-solubilizing groups, of the general formula (2)
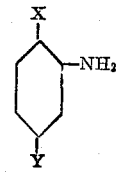

in which the symbols X and Y have the same significance as in Formula 1 above, with an aminobenzene carboxylic acid-sulfonic acid of the general formula (3)
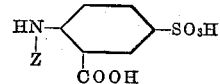

in which Z indicates a low molecular, branched alkyl radical, preferably an isopropyl or an isobutyl radical. The condensation advantageously takes place in an alkaline medium, and the resulting alkali salts of the diazoamino-compounds can easily be isolated by methods known per se, for example by salting out or by subjecting a solution thereof, if desired after filtration, to a rapid drying process. There may be primarily mentioned as suitable aromatic bases, free from water-solubilizing groups, of the Formula 2, those containing a sulfonamide group of which the nitrogen atom is attached on one side to the —SO₂-group and on the other side to a carbon atom of an alkyl group and to a hydrogen atom or to two carbon atoms of a single aliphatic chain, if desired interrupted by hetero atoms, or preferably to one carbon atom of each of two low molecular alkyl radicals. As examples of such bases of the Formula 2, the following may be especially mentioned:

1-aminobenzene-3-sulfonic acid piperidide,
1-amino-2-methoxybenzene-5-sulfonic acid diethylamide,
1-amino-2-methoxybenzene-5-sulfonic acid dimethylamide,
1-amino-2-methylbenzene-5-sulfonic acid diethylamide,
1-amino-2-methylbenzene-5-sulfonic acid dimethylamide,
1-amino-2-methylbenzene-5-sulfonic acid morpholide,
1-amino-2-methyl- or -methoxybenzene-5-sulfonic acid piperidide,
1-amino-2-methoxybenzene-5-sulfonic acid morpholide,
1-amino-2-methoxy- or -methylbenzene-5-sulfonic acid isopropyl amide.

The printing preparations are produced from the specified components with the addition of the customary solvents and thickening agents. There are advantageously used in the present process printing preparations of the specified type to which a free alkali metal hydroxide, for example sodium or potassium hydroxide, has been added in such quantities that in the printing preparation, to 1 mol of coupling component more than 1 mol, preferably 2.1 to 5 mols of free alkali metal hydroxide are present. The resulting printing preparations are stable.

By means of the present process there can be printed uniform and mixed fabrics, especially such as consist of cellulose fibers, using any customary method, for example film or roller printing. Color fast prints are thus obtained on neutral or acid steaming in the absence of the specified halogen-fatty acid salts. In many cases, the printed fabric, pre-dried in the customary manner, can be developed by heating to temperatures above 100° C., preferably 130–150° C. This can be carried out, for example, in electrically or otherwise heated chambers without the supply of steam. For this purpose there must be added to the printing pastes small quantities of hydrophilic substances, for example glycerol.

The following examples illustrate the invention, the parts and percentages being by weight unless otherwise stated and the relation between part by weight and part by volume being the same as that between the kilogram and the liter.

*Eaxmples*

Printing preparations are made up containing in each 100 parts, the quantities of ingredients set forth in the following table:

10 minutes at 40–50° C. with an enzyme preparation. Then cold rinsing is repeated, followed by 10 minutes soaping at the boil, repeated rinsing and drying. Clean, full prints are obtained. The same printing effect is also obtained when instead of neutral steaming, acid steaming is carried out for 2–5 minutes at 100° C.

The diazoamino-compound required for the manufacture of printing paste A can be prepared as follows:

24.2 parts of 1-amino-2-methylbenzene-5-sulfondiethylamide are diazotized in the customary manner in 45 parts of 10% hydrochloric acid and 30 parts of ice with 6.9 parts of sodium nitrite in 25 parts of water. At the same time 28.5 parts of 1-isopropyl-aminobenzene-2-carboxylic acid-4-sulfonic acid are dissolved in 200 parts of water with the equivalent quantity of 30% sodium hydroxide solution and 60 parts of potassium carbonate are also added. As soon as the whole is dissolved, the solution is cooled to 0° C. and the filtered diazo solution is added dropwise within 20 minutes with good stirring. After a short time, the diazoamino-

| Example | Diazoamino-compound from— Base | Diazoamino-compound from— Stabilizer | Titre, percent | Parts | Coupling component | Parts | Sodium sulfate | Sodium di-isopropyl-naphthalene sulfonate | Shade of print |
|---|---|---|---|---|---|---|---|---|---|
| A | 1-Amino-2-methyl-benzene-5-sulfon-diethyl-amide. | 1-Isopropyl-amino-benzene-2-carboxylic acid-4-sulfonic acid. | 70 | 57.0 | 1-(2':3'hydroxy-naphthoyl)-amino-2:5-dimethoxy-4-chloro-benzene. | 26.5 | 15.5 | 1.0 | yellowish red. |
| B | 1-Amino-2-methyl-benzene-5-sulfon-dimethylamide. | 1-Isobutylaminobenzene-2-carboxylic acid 4-sulfonic acid. | 60 | 71.2 | ....do.... | 27.8 | | 1.0 | bluish scarlet. |
| C | 1-Amino-2-methyl-benzene-5-sulfon-morpholide. | ....do.... | 50 | 74.4 | 1-(2':3'-hydroxy-naphthoyl)-amino-2-ethoxy benzene. | 21.5 | 3.1 | 1.0 | orange. |
| D | 1-Amino-2-methoxy-benzene-5-sulfon-diethylamide. | ....do.... | 78 | 56.8 | 1-(2':3'-hydroxy-naphthoyl)-amino-2:4-dimethoxy-5-chloro-benzene. | 29.4 | 12.8 | 1.0 | bluish red. |
| E | 1-Amino-2-methyl-benzene-5-sulfon-piperidide. | ....do.... | 65 | 62.1 | 3-hydroxycarbazole-2-carboxylic acid-4'-chloranilide. | 25.2 | 11.7 | 1.0 | fawn. |
| F | 1-Amino-2-methyl-benzene-5-sulfon-diethylamide. | ....do.... | 60 | 62.0 | 1-Acetoacetylamino-4-benzoylamino-2:5-diethoxybenzene. | 27.2 | 9.8 | 1.0 | golden yellow. |
| G | 1-Amino-2-methyl-benzene-5-sulfon-piperidide. | 1-Isopropylamino-benzene-2-carboxylic acid-4-sulfonic acid. | 55 | 68.8 | 1-(2':3'-hydroxy-naphthoyl)-amino-2-ethoxy benzene. | 23.2 | 7.0 | 1.0 | yellow orange. |
| H | 1-amino-2-methoxy-benzene-5-sulfon-dimethyl-amide. | 1-Isobutylaminobenzene-2-carboxylic acid-4-sulfonic acid. | 55 | 73.2 | ....do.... | 24.1 | 1.7 | 1.0 | red-orange. |
| I | 1-Amino-2-methoxy-benzene-5-sulfon-morpholide. | ....do.... | 60 | 71.1 | 1-Acetoacetyl-amino-4-acetyl-amino-2-chloro-5-methoxy-benzene. | 23.0 | 4.9 | 1.0 | green yellow. |
| K | ....do.... | 1-Isopropyl-amino-benzene-2-carboxylic acid-4-sulfonic acid. | 55 | 74.3 | 1-(2':3'-hydroxynaphthoyl)-amino-2-methoxy-benzene. | 22.1 | 2.6 | 1.0 | red. |
| L | 1-Amino-2-methoxy-benzene-5-sulfon-isopropyl-amide. | 1-Isobutyl-amino-benzene-2-carboxylic acid-4-sulfonic acid. | 55 | 73.2 | 1-(2':3'-hydroxynaphthoyl)-amino-2-methyl-4-chloro-benzene. | 23.7 | 2.1 | 1.0 | bluish red. |

With these printing preparations, printing pastes are made up as follows:

compound crystallizes in fine leaflets and after 2 hours the coupling is complete. For completion of the separa-

| | A | B | C | D | E | F | G | H | I | K | L |
|---|---|---|---|---|---|---|---|---|---|---|---|
| Printing preparation | 80 | 80 | 80 | 60 | 60 | 80 | 80 | 80 | 60 | 80 | 80 |
| Denatured alcohol | 30 | 30 | 30 | 20 | | 50 | 50 | 50 | 50 | 50 | 50 |
| Thiodiethylene glycol | 50 | | | | 50 | | | | | | |
| Urea | | | | | 30 | | | | | | |
| Sodium di-iso-propyl-naphthalene-sulfonate, 10% solution | | 20 | 20 | 20 | | | | | | | |
| 30% Sodium hydroxide solution | 20 | 20 | 15 | 20 | 15 | 15 | 20 | 15 | 15 | 20 | 20 |
| Water | 300 | 330 | 285 | 310 | 275 | 285 | 280 | 285 | 305 | 280 | 280 |
| Neutral Starch Tragacanth-Thickening | 500 | 500 | 550 | 550 | 550 | 550 | 550 | 550 | 550 | 550 | 550 |
| Sodium chlorate cryst. | 10 | 10 | 10 | 10 | 10 | 10 | 10 | 10 | 10 | 10 | 10 |
| Turpentine | 10 | 10 | 10 | 10 | 10 | 10 | 10 | 10 | 10 | 10 | 10 |
| | 1,000 | 1,000 | 1,000 | 1,000 | 1,000 | 1,000 | 1,000 | 1,000 | 1,000 | 1,000 | 1,000 |

A cotton fabric is printed with these pastes. The printed material is dried at 50–60° C. and then subjected to neutral steaming in a Mather and Platt steamer for 5–8 minutes at 100° C. Cold rinsing is then carried out followed by treatment for removal of the starch for tion, 10 volumes percent of sodium chloride are further added, stirring is continued for 1 hour and then the well defined crystalline precipitate is filtered with suction. It is washed with a little saturated sodium chloride solution, pressed off and dried under vacuum at 45–50° C.

The diazoamino-compound obtained in good yield has a content of 65–70% and is easily soluble in water.

By this method there can be obtained from (a) 24.2 parts of 1-amino-2-methylbenzene-5-sulfon-diethylamide and 30 parts of 1-isobutyl-aminobenzene-2-carboxylic acid-4-sulfonic acid, (b) 21.4 parts of 1-amino-2-methylbenzene-5-sulfon-dimethylamide and 30 parts of 1-isobutyl-aminobenzene-2-carboxylic acid-4-sulfonic acid, (c) 25.8 parts of 1-amino-2-methoxybenzene-5-sulfon-diethylamide and 30 parts of 1-isobutyl-aminobenzene-2-carboxylic acid-4-sulfonic acid, (d) 25.8 parts of 1-amino-2-methoxybenzene-5-sulfon-diethylamide and 28.5 parts of 1-isopropyl-aminobenzene-2-carboxylic acid-4-sulfonic acid, (e) 21.4 parts of 1-amino-2-methylbenzene-5-sulfon-dimethylamide and 28.5 parts of 1-isopropyl-aminobenzene-2-carboxylic acid-4-sulfonic acid, (f) 25.4 parts of 1-amino-2-methylbenzene-5-sulfon-piperidide and 30 parts of 1-isobutyl-aminobenzene-2-carboxylic acid-4-sulfonic acid, the corresponding diazoamino-compounds in yields of 75–85% of the theoretical; they have similar properties.

The diazoamino-compound used for the production of the printing preparation C was obtained as follows:

A diazo solution prepared in the customary manner from 25.6 parts of 1-amino-2-methylbenzene-5-sulfon-morpholide of the formula

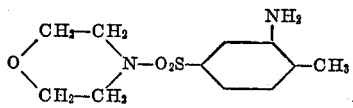

is introduced dropwise within 20 minutes into a solution of 31.7 parts of the disodium salt of 1-isobutylaminobenzene-2-carboxylic acid-4-sulfonic acid, 2 parts of anhydrous sodium carbonate and 2 parts of sodium bicarbonate in 300 parts of water, cooled to 0 to minus 2° C. At the same time so much 30% sodium hydroxide solution is added dropwise that the pH value of the mixture continuously amounts to 9.5–10. It is finally adjusted to 10 and the whole filtered from a little impurity and the solution evaporated in a spray drier, the entry temperature of the air being between 130 and 180° C. and the exit temperature not less than 70° C. and not considerably more than 100° C.

The resulting fine, yellowish powder has a content of about 50% of diazoamino-compound. The yield amounts to 80–85% of the theoretical.

By this method there can be obtained from (a) 27.2 parts of 1-amino-2-methoxybenzene-5-sulfonmorpholide and 30.3 parts of the disodium salt of 1 - isopropylaminobenzene-2-carboxylic acid-4-sulfonic acid, (b) 27.2 parts of 1-amino-2-methoxybenzene-5-sulfonmorpholide and 31.7 parts of the disodium salt of 1-isobutylaminobenzene - 2 - carboxylic acid-4-sulfonic acid, (c) 23.0 parts of 1-amino-2-methoxybenzene-5-sulfon-dimethylamide and 31.7 parts of the disodium salt of 1-isobutylaminobenzene - 2 - carboxylic acid-4-sulfonic acid, (d) 25.4 parts of 1-amino-2-methylbenzene-5-sulfon-piperidide and 30.3 parts of the disodium salt of 1-isopropylaminobenzene-2-carboxylic acid-4-sulfonic acid, (e) 24.4 parts of 1-amino-2-methoxybenzene-5-sulfon-isopropylamide and 31.7 parts of the disodium salt of 1-isobutylaminobenzene - 2 - carboxylic acid-4-sulfonic acid, the corresponding diazoamino-compounds in yields of 80–85% of the theoretical; they have similar properties.

What is claimed is:

1. In a process for the production of a water-insoluble azo dyestuff on the fiber by printing on of a coupling component and a stabilized diazo compound and development of the dyestuff by steaming with steam at a pH not above neutrality, the improvement of carrying out said process, in the absence of halogen fatty acids and their salts, with a coupling component suitable for the manufacture of ice-colors, an alkali in a quantity of more than 2 mol calculated on the quantity of the coupling component used and a labile diazo-amino compound of the formula

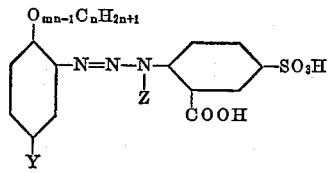

in which Y is an alkylated sulfonamide group, Z is a low molecular, branched alkyl radical having at most 4 C atoms and $m$ and $n$ are each a positive whole number of which the product is at most 2.

2. In a process for the production of a water-insoluble azo dyestuff on the fiber by printing on of a coupling component and a stabilized diazo compound and development of the dyestuff by steaming selectively with neutral steam and with acid steam, respectively, the improvement of carrying out said process, in the absence of halogen fatty acid and their salts, with a coupling component suitable for making ice colors and a labile diazo-amino compound of the formula

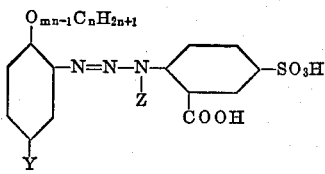

in which Y is an alkylated sulfonamide group, Z is a low molecular branched alkyl radical having at most 4 C atoms and $m$ and $n$ are each a positive whole number of which the product is at most 2, and a quantity of 2.1 to 5 mols of free alkali hydroxide per one mol of the coupling component.

3. In a process for the production of a water-insoluble azo dyestuff on the fiber by printing on of a coupling component and a stabilized diazo compound and development of the dyestuff by steaming selectively with neutral steam and with acid steam, respectively, the improvement of carrying out said process, in the absence of halogen fatty acids and their salts, with a coupling component selected from the group consisting of the arylides of acetoacetic acid, of 2-hydroxy-carbazole-3-carboxylic acid and of 2-hydroxy-naphthalene-3-carboxylic acid, 2.1–5 mols of alkali hydroxide per one mol of coupling component and a labile diazo-amino compound of the formula

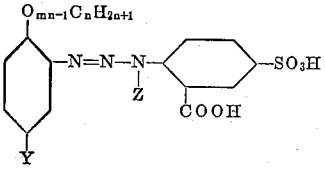

in which Y is an alkylated sulonamide group, Z is a low molecular, branched alkyl radical having at most 4 C atoms and $m$ and $n$ are each a positive whole number of which the product is at most 2.

4. In a process for the production of a water-insoluble azo dyestuff on the fiber by printing on of a coupling component and a stabilized diazo compound and development of the dyestuff by steaming selectively with neutral steam and with acid steam, respectively, the improvement of carrying out said process, in the absence of halogen fatty acids and their salts, with a coupling component selected from the group consisting of the arylides of aceto acetic acid, of 2-hydroxy-carbazole-3-carboxylic acid and of 2-hydroxynaphthalene-3-carboxylic acid, 2.1–5 mols of an alkali hydroxide per mole of coupling component and a labile diazo-amino compound of the formula

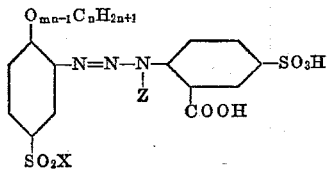

in which Z is a member selected from the group consisting of the isopropyl and isobutyl radicals and X stands for one of the radicals

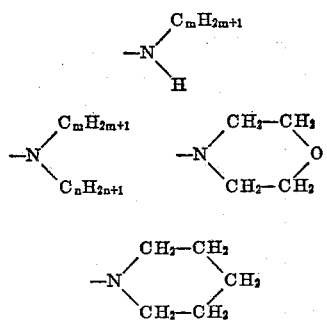

and

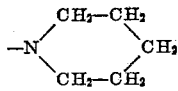

wherein $m$ and $n$ each represent a whole number of at most 2.

5. In a process for the production of a water-insoluble azo dyestuff on the fiber by printing on of a coupling component and a stabilized diazo compound and development of the dyestuff by steaming selectively with neutral steam and with acid steam, respectively, the improvement of carrying out said process, in the absence of halogen fatty acids and their salts, with a coupling component selected from the group consisting of the anilides of aceto acetic acid, of 2-hydroxy-carbazole-3-carboxylic acid and of 2-hydroxynaphthalene-3-carboxylic acid, 2.1–5 mols of an alkali hydroxide per mol of coupling component and a labile diazo-amino compound of the formula

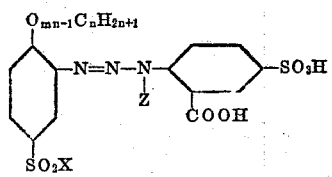

in which Z is a member selected from the group consisting of the isopropyl and isobutyl radicals and X stands for one of the radicals

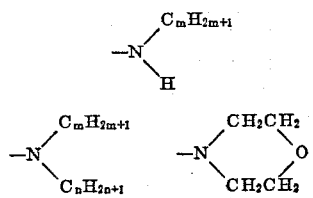

and

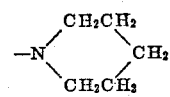

wherein $m$ and $n$ each represent a whole number of at most 2.

6. In a process for the production of a water-insoluble azo dyestuff on the fiber by printing on of a coupling component and a stabilized diazo compound and development of the dyestuff by steaming selectively with neutral steam and with acid steam, respectively, the improvement of carrying out said process, in the absence of halogen fatty acids and their salts, with the coupling component of the formula

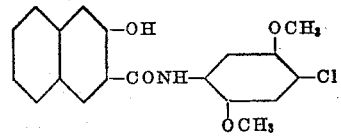

the diazo-amino compound of the formula

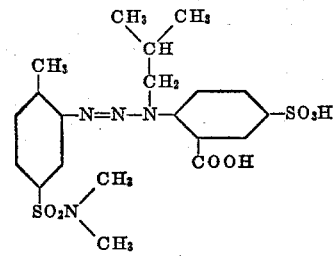

and 2.1–5 mols of an alkali hydroxide per mol of the coupling component.

7. In a process for the production of a water-insoluble azo dyestuff on the fiber by printing on of a coupling component and a stabilized diazo compound and development of the dyestuff by steaming selectively with neutral steam and with acid steam, respectively, the improvement of carrying out said process, in the absence of halogen fatty acids and their salts, with the coupling component of the formula

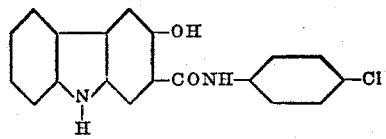

the diazo-amino compound of the formula

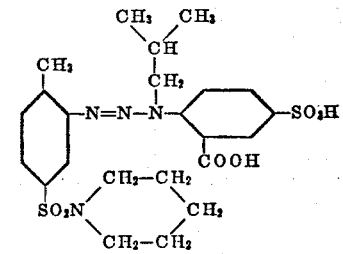

and 2.1–5 mols of an alkali hydroxide per mol of coupling component.

8. In a process for the production of a water-insoluble azo dyestuff on the fiber by printing on of a coupling component and a stabilized diazo compound and development of the dyestuff by steaming selectively with neutral steam and with acid steam, respectively, the improvement of carrying out said process, in the absence of halogen fatty acids and their salts, with the coupling component of the formula

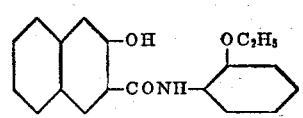

the diazo amino compound of the formula

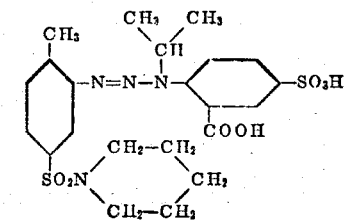

and 2.1–5 mols of an alkali hydroxide per mol of coupling component.

9. A printing preparation which is free from halogenated fatty acids and their salts and contains a coupling component suitable for the manufacture of ice-colors, an alkali in a quantity of more than 2 mols calculated on the quantity of the coupling component used and a labile diazo-amino compound of the formula

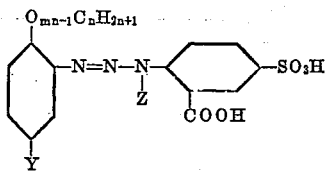

in which Y is a alkylated sulfonamide group, Z is a low molecular, branched alkyl radical having at most 4 carbon atoms and $m$ and $n$ are each a positive whole number of which the product is at most 2.

10. A printing preparation containing a labile diazo-amino compound of the formula

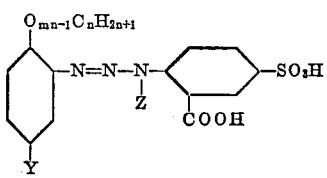

in which Y is a alkylated sulfonamide group, Z is a low molecular, branched alkyl radical having at most 4 carbon atoms and $m$ and $n$ are each a positive whole number of which the product is at most 2 and instead of halogen fatty acids or their salts a quantity of 2.1 to 5 mols of free alkali hydroxide per one mol of the coupling component present in the preparation.

11. A printing preparation which is free from halogenated fatty acids and their salts and contains a coupling component selected from the group consisting of the arylides of acetoacetic acid, of 2-hydroxy-carbazole-3-carboxylic acid and of 2-hydroxynaphthalene-3-carboxylic acid, 2.1–5 mols of alkali hydroxide per one mol of coupling component and a labile diazo-amino compound of the formula

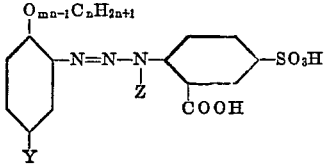

in which Y is an alkylated sulfonamido group, Z is a low molecular, branched alkyl radical having at most 4 carbon atoms and $m$ and $n$ are each a positive whole number of which the product is at most 2.

12. A printing preparation which is free from halogenated fatty acids and their salts and contains a coupling component selected from the group consisting of the arylides of acetoacetic acid, of 2-hydroxy-carbazole-3-carboxylic acid and of 2-hydroxynaphthalene-3-carboxylic acid, 2.1–5 mols of an alkali hydroxide per mol of coupling component and a labile diazo-amino compound of the formula

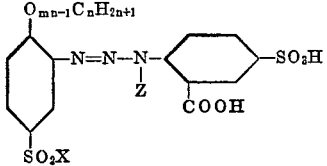

in which Z is a member selected from the group consisting of the isopropyl and isobutyl radicals and X stands for one of the radicals

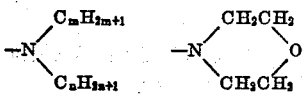

and

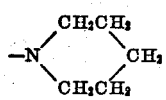

wherein $m$ and $n$ each represent a whole number of at most 2.

13. A printing preparation which is free from halogenated fatty acids and their salts and contains a coupling component selected from the group consisting of the anilides of acetoacetic acid, of 2-hydroxy-carbazole-3-carboxylic acid and of 2-hydroxynaphthalene-3-carboxylic acid, 2.1–5 mols of an alkali hydroxide per mol of coupling component and a labile diazo-amino compound of the formula

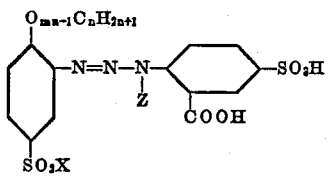

in which Z is a member selected from the group consisting of the isopropyl and isobutyl radicals and X stands for one of the radicals,

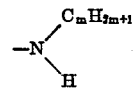

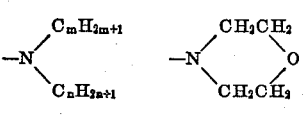

and

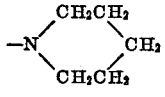

wherein $m$ and $n$ each represent a whole number of at most 2.

14. A printing preparation which is free from halogenated fatty acids and their salts and contains the coupling compound of the formula

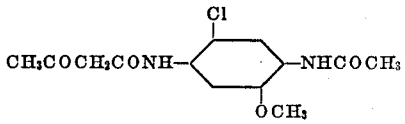

the diazo-compound of the formula

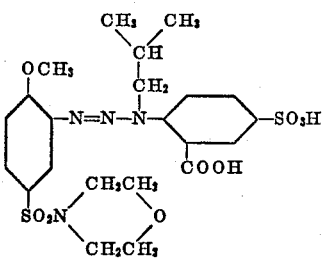

and 2.1–5 mols of an alkali hydroxide per mol of coupling component.

15. A printing preparation which is free from halogenated fatty acids and their salts and contains the coupling component of the formula

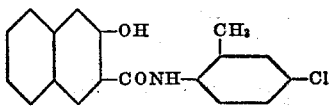

the diazo-amino compound of the formula

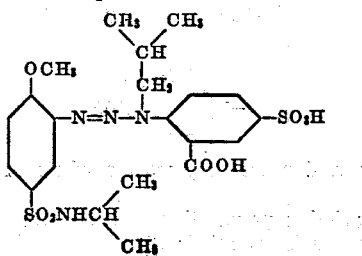

and 2.1–5 mols of an alkali hydroxide per mol of coupling component.

References Cited in the file of this patent

UNITED STATES PATENTS

| | | |
|---|---|---|
| 2,758,001 | Glietenberg | Aug. 7, 1956 |
| 2,781,337 | Moser et al. | Feb. 12, 1957 |
| 2,781,338 | Moser | Feb. 12, 1957 |
| 2,822,234 | Breig | Feb. 4, 1958 |

FOREIGN PATENTS

| | | |
|---|---|---|
| 1,058,960 | France | Mar. 22, 1954 |
| 1,067,249 | France | June 14, 1954 |

OTHER REFERENCES

Lubs: The Chem. of Synthetic Dyes and Pigments, Reinhold Pub. Co., N.Y., 1955, pp. 203–204.

Jour. Soc. Dyers and Co., July 1955, pp. 418–419.

UNITED STATES PATENT OFFICE
CERTIFICATION OF CORRECTION

Patent No. 2,970,030                      January 31, 1961

Albert Bolleter et al.

It is hereby certified that error appears in the above numbered patent requiring correction and that the said Letters Patent should read as corrected below.

Column 3, line 17, for "Eaxmples", in italics, read -- Examples --, in italics; columns 3 and 4, first table thereof, column 6, line 13 thereof, for "3-hydrocycarbazole-" read -- 3-hydroxycarbazole- --; column 6, line 64, for "sulonamide" read -- sulfonamide --; column 7, lines 15 and 54, and column 10, lines 1 and 35, for "radicals", each occurrence, read -- radicals and m and n are each a positive whole number of which the product is at most 2, --.

Signed and sealed this 10th day of April 1962.

(SEAL)
Attest:

ERNEST W. SWIDER                      DAVID L. LADD
Attesting Officer                      Commissioner of Patents